(12) United States Patent
Honoki et al.

(10) Patent No.: US 11,953,342 B2
(45) Date of Patent: Apr. 9, 2024

(54) LASER MARKING SYSTEM AND PORTABLE TERMINAL DEVICE

(71) Applicant: MAKITA CORPORATION, Anjo (JP)

(72) Inventors: Manami Honoki, Anjo (JP); Yoichiro Koike, Anjo (JP); Masafumi Noda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 375 days.

(21) Appl. No.: 17/365,376

(22) Filed: Jul. 1, 2021

(65) Prior Publication Data

US 2022/0003546 A1 Jan. 6, 2022

(30) Foreign Application Priority Data

Jul. 1, 2020 (JP) .................. 2020-114360

(51) Int. Cl.
*G01C 9/06* (2006.01)
*G08C 17/02* (2006.01)

(52) U.S. Cl.
CPC ............ *G01C 9/06* (2013.01); *G08C 17/02* (2013.01); *G01C 2009/066* (2013.01)

(58) Field of Classification Search
CPC ........................ G01C 9/06; G01C 2009/006
USPC .................................... 33/290–296
See application file for complete search history.

(56) References Cited

U.S. PATENT DOCUMENTS

| | | | | |
|---|---|---|---|---|
| 4,471,530 A | * | 9/1984 | Kirven | G01C 15/004 33/286 |
| 5,457,890 A | * | 10/1995 | Mooty | G01C 15/002 33/294 |
| 6,508,006 B1 | * | 1/2003 | Black | G01C 15/06 33/293 |
| 6,606,798 B2 | * | 8/2003 | El-Katcha | G01C 15/06 33/290 |
| 9,175,956 B2 | * | 11/2015 | Fessler | G01B 11/00 |
| 9,200,900 B2 | * | 12/2015 | Fessler | G01C 15/004 |
| 9,207,077 B2 | * | 12/2015 | Kehl | G01C 15/00 |
| 9,228,837 B2 | * | 1/2016 | Dumoulin | G01J 1/44 |
| 9,255,798 B2 | * | 2/2016 | Kahlow | G01C 15/06 |
| 2021/0124021 A1 | * | 4/2021 | Yasutomi | G01S 7/4817 |

FOREIGN PATENT DOCUMENTS

| | | |
|---|---|---|
| JP | H06-147896 A | 5/1994 |
| JP | 2009/008479 A | 1/2009 |
| JP | 2019-219319 A | 12/2019 |
| JP | 6628633 B2 | 1/2020 |

OTHER PUBLICATIONS

Nov. 28, 2023 Notice of Reasons for Refusal issued in Japanese Patent Application No. 2020-114360.

* cited by examiner

*Primary Examiner* — George B Bennett
(74) *Attorney, Agent, or Firm* — Oliff PLC

(57) ABSTRACT

A laser marking system in one aspect of the present disclosure includes a laser marker, a beam receiving device, and a notifier. The laser marker includes a laser beam emitter. The beam receiving device includes a beam receiver and a transmitter. The beam receiver receives a laser beam emitted by the laser beam emitter. The transmitter transmits a first positional signal. The first positional signal indicates a receiving position of the laser beam in the beam receiver. The notifier notifies of the receiving position of the laser beam based on the first positional signal.

13 Claims, 11 Drawing Sheets

LASER MARKING SYSTEM AND PORTABLE TERMINAL DEVICE

CROSS-REFERENCE TO RELATED APPLICATIONS

This application claims the benefit of Japanese Patent Application No. 2020-114360 filed on Jul. 1, 2020 with the Japan Patent Office, the entire disclosure of which is incorporated herein by reference.

BACKGROUND

The present disclosure relates to a laser marker.

Japanese Patent No. 6628633 discloses a laser marker configured to be manipulated with a remote controller. The remote controller includes a beam receiver. The remote controller is placed at a position away from the laser marker. The beam receiver receives a laser beam emitted from the laser marker. The remote controller further includes a Light Emitting Diode (LED) and a buzzer, to thereby notify of a receiving position of a laser beam in the beam receiver with a lighting of the LED and a buzzing sound. A user of the laser marker adjusts a position of the laser beam based on the notified receiving position of the laser beam.

SUMMARY

When the user adjusts the position of the laser beam at a position away from the remote controller, the user has a difficulty in identifying the lighting of the LED and the buzzing sound. Consequently, this causes a difficulty for the user in adjusting the position of the laser beam.

In one aspect of the present disclosure, it is desirable to easily adjust a position of a laser beam.

A laser marking system in one aspect of the present disclosure includes a laser marker (or a laser level or a laser leveling device), a beam receiving device, and a notifier. The laser marker includes a laser beam emitter configured to emit a laser beam. The beam receiving device includes a beam receiver and a transmitter. The beam receiver receives the laser beam emitted from the laser beam emitter. The transmitter transmits a first positional signal. The first positional signal indicates a receiving position of the laser beam in the beam receiver. The receiving position of the laser beam corresponds to a center position, a left position, or a right position. The center position corresponds to a center of the beam receiver. The left position corresponds to a leftward position to the center position. The right position corresponds to a rightward position to the center position. The notifier notifies of the receiving position of the laser beam based on the first positional signal transmitted by the transmitter.

In the above laser marking system, the beam receiving device transmits the first positional signal and the receiving position of the laser beam is notified based on the transmitted first positional signal. Accordingly, a user of the laser marking system can identify the receiving position of the laser beam at a position away from the beam receiving device and easily adjust a position of the laser beam.

At least one of the laser marker, the beam receiving device, or the notifier may be removed from the laser marking system.

The laser marker may further include a device communicator. The device communicator is configured to receive the first positional signal and transmit a second positional signal. The second positional signal corresponds to (or is associated with or is related to) the first positional signal. In a case where the laser marker further includes the device communicator, the laser marker can transmit the second positional signal.

The laser marking system may further include a portable terminal device. The portable terminal device may include a terminal communicator and/or the notifier. The terminal communicator is configured to receive the first positional signal or the second positional signal.

In a case where the laser marking system includes the portable terminal device and the portable terminal device includes the device communicator and the notifier, the user can identify the receiving position of the laser beam via the portable terminal device. Consequently, the user can easily adjust the position of the laser beam at the position away from the beam receiving device.

The device communicator may perform a first wireless communication with the transmitter and perform a second wireless communication with the portable terminal device. The transmitter may transmit the first positional signal to the device communicator through the first wireless communication. The terminal communicator may receive the second positional signal through the second wireless communication. The notifier may notify of the receiving position of the laser beam based on the second positional signal received by the terminal communicator.

The beam receiving device transmits the first positional signal to the laser marker. Then, the laser marker transmits the second positional signal, which corresponds to the first positional signal, to the portable terminal device. Accordingly, the portable terminal device can receive the receiving position of the laser beam via the laser marker.

The laser marker may include the notifier. The transmitter may transmit the first positional signal to the device communicator through the wireless communication. The notifier may notify of the receiving position of the laser beam based on the first positional signal received by the device communicator.

In a case where the laser marker includes the notifier, the user can manipulate the laser marker to adjust the position of the laser beam while identifying the receiving position of the laser beam near the laser marker.

The notifier provided to the portable terminal device may include a display, a speaker, and/or a vibrator. The display may show the receiving position of the laser beam based on the first positional signal or the second positional signal. The speaker may output a sound based on the first positional signal or the second positional signal. The sound may correspond to the receiving position of the laser beam. The vibrator may output a vibration based on the first positional signal or the second positional signal. The vibration may correspond to the receiving position of the laser beam.

In a case where the notifier includes the display, the speaker, and the vibrator, the user can identify the receiving position of the laser beam by checking out the display. Since the speaker and the vibrator, respectively, output the sound and the vibration corresponding to the receiving position of the laser beam, the user can identify the receiving position of the laser beam without checking out the display.

The portable terminal device may further include a limiter. The limiter may set an output limitation(s) on the speaker and/or the vibrator. The speaker and/or the vibrator may give a priority to the output limitation(s), to thereby stop outputting the sound and/or the vibration in response to the limiter setting or having set the output limitation(s).

In a case where the portable terminal device includes the limiter, the sound and/or the vibration, which indicate(s) the receiving position of the laser beam, stop(s) being output in response to the output limitation(s) on the speaker and/or the vibrator. Accordingly, it is possible to inhibit the sound and/or the vibration from being output without intention of the user when the user identifies the receiving position of the laser beam via the portable terminal device.

A portable terminal device in another aspect of the present disclosure includes a terminal communicator and a notifier. The terminal communicator receives a positional signal through a wireless communication. The positional signal indicates a receiving position of a laser beam in a beam receiver of a beam receiving device. The laser beam is output from the laser marker and received by the beam receiver. The receiving position of the laser beam corresponds to a center position, a left position, or a right position. The center position corresponds to a center of the beam receiver. The left position corresponds to a leftward position to the center position. The right position corresponds to a rightward position to the center position. The notifier notifies of the receiving position of the laser beam based on the positional signal received by the terminal communicator.

The portable terminal device as mentioned above receives the positional signal and notifies of the receiving position of the laser beam based on the positional signal. Accordingly, a user of the portable terminal device can both identify the receiving position of the laser beam and easily adjust a position of the laser beam via the portable terminal device.

A method of notifying of a receiving position of a laser beam via a portable terminal device according to still another aspect of the present disclosure includes:

obtaining a positional signal, the positional signal indicating a receiving position of a laser beam in a beam receiver of a beam receiving device, the laser beam being output from a laser marker, the receiving position of the laser beam corresponding to a center position, a left position, or a right position, the center position corresponding to a center of the beam receiver, the left position corresponding to a leftward position to the center position, and the right position corresponding to a rightward position to the center position; and notifying of the receiving position of the laser beam based on the positional signal obtained.

The portable terminal device executes the above method, to thereby obtain the positional signal and notify of the receiving position of the laser beam based on the positional signal. Accordingly, the user can both identify the receiving position of the laser beam and easily adjust a position of the laser beam via the portable terminal device.

The portable terminal device may include a display. Notifying of the receiving position of the laser beam based on the positional signal received may include showing the receiving position of the laser beam on the display based on the positional signal.

The portable terminal device may include a speaker. Notifying of the receiving position of the laser beam based on the positional signal received may include outputting a sound via the speaker based on the positional signal, the sound corresponding to the receiving position of the laser beam.

The portable terminal device may include a vibrator. Notifying of the receiving position of the laser beam based on the positional signal received may include outputting a vibration via the vibrator based on the positional signal, the vibration corresponding to the receiving position of the laser beam.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

It should be noted that the present disclosure is not limited to the embodiment below and may be practiced in various forms as long as it falls within the technical scope of the present disclosure.

<1. Overall Configuration>

<1-1. System>

Figure 1:
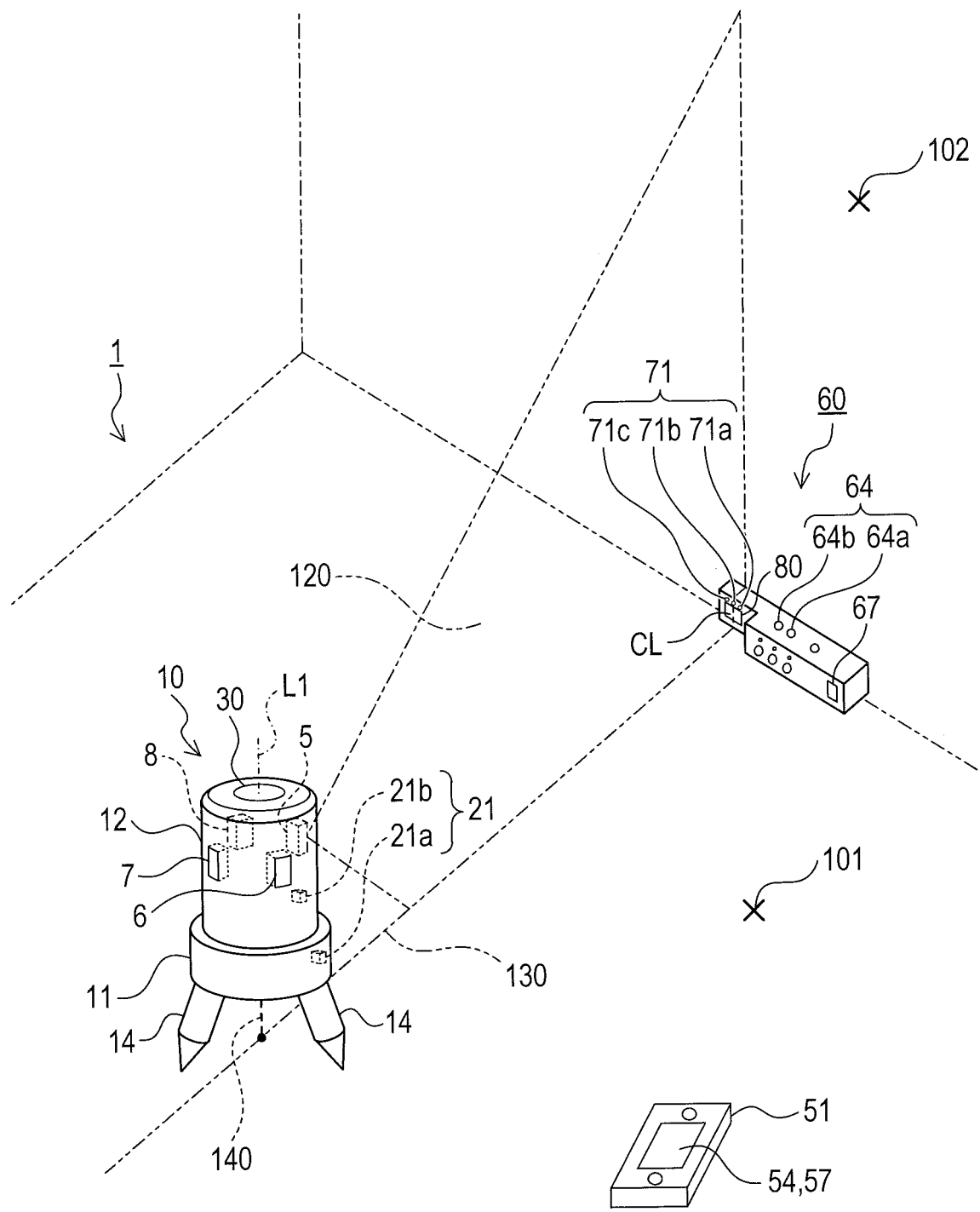
FIG. 1 is a schematic view of a laser marking system according to the present embodiment.

As shown in FIG. 1, a laser marking system 1 according to the present embodiment includes a laser marker 10, a portable terminal device 51, and a beam receiving device 60. In another embodiment, the portable terminal device 51 or the beam receiving device 60 may be removed from the laser marking system 1.

The laser marker 10 projects a laser beam onto an object. The projected laser beam indicates a reference line. The laser marking system 1 is configured such that the portable terminal device 51 or the beam receiving device 60 controls a rotation of the laser marker 10, specifically a position of the laser beam, at a position distanced from the laser marker 10.

<1-2. Laser Marker>

The laser marker 10 includes a support body 11 and a rotation body 12. The support body 11 includes legs 14. In the present embodiment, the support body 11 includes three legs 14. The support body 11 is supported by the legs 14 on a floor 101. Hereinafter, the floor 101 or a surface other than the floor 101, on which the laser marker 10 is placed, is also referred to as a placement surface.

The rotation body 12 is configured to rotate about a center axis L1 with respect to the support body 11. In FIG. 1, the laser marker 10 is placed such that the center axis L1 is vertical to the placement surface.

The rotation body 12 is formed into substantially a cylindrical shape and extends along the center axis L1. The rotation body 12 includes a first emitter 5, a second emitter 6, a third emitter 7, and a fourth emitter 8. The first to the fourth emitters 5 to 8 each emit a laser beam outward of the laser marker 10. The rotation body 12 includes, in its upper surface, a user interface 30.

Figure 2:
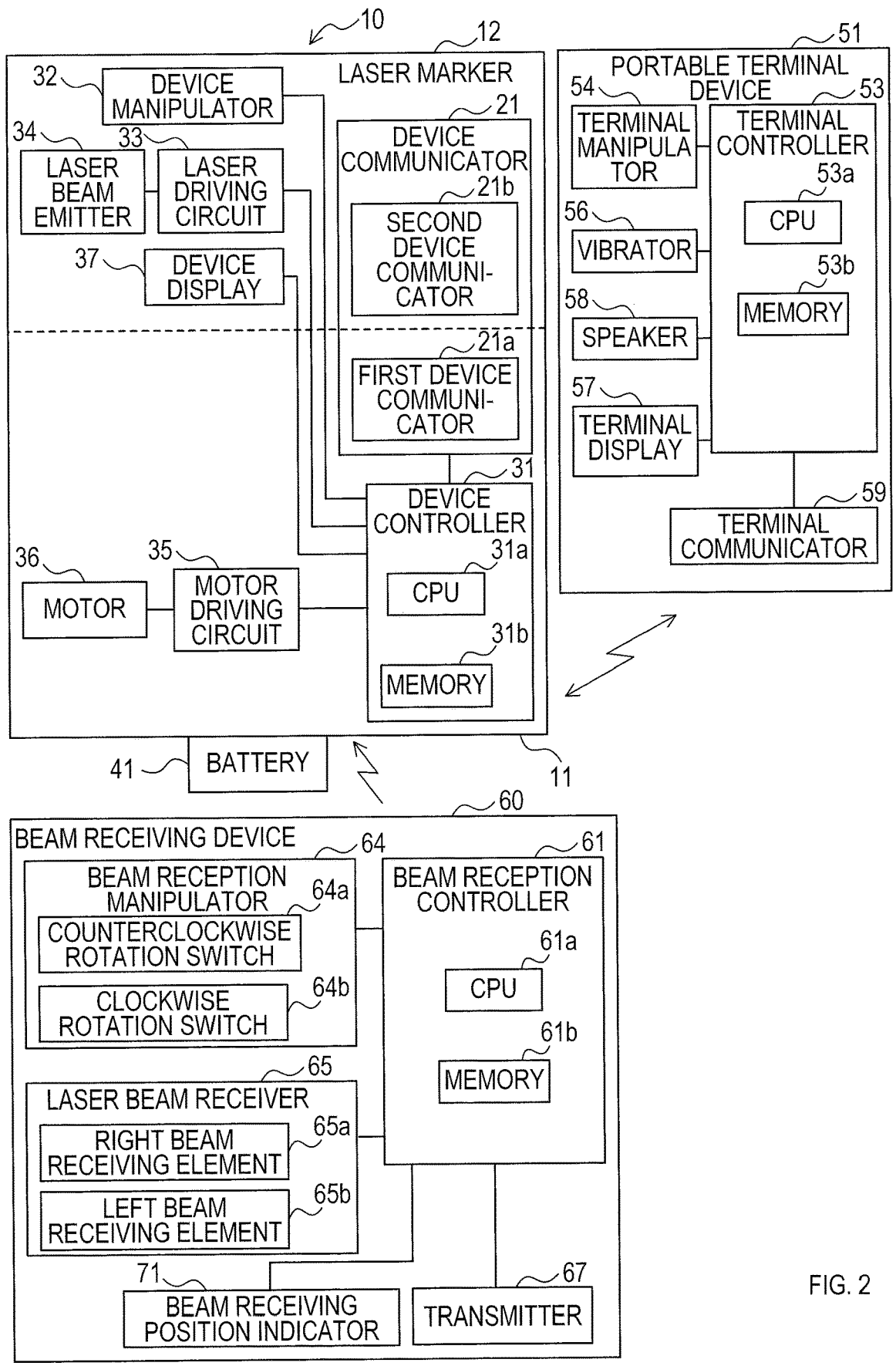
FIG. 2 is a block diagram showing an electrical configuration of the laser marking system.

The first to the fourth emitters 5 to 8 are arranged at a specified interval (for example, at a 90° interval) along a circumferential direction of the rotation body 12. The first to the fourth emitters 5 to 8 each include a laser beam emitter 34 (see. FIG. 2). The laser beam emitter 34 generates the laser beam. The laser beam emitter 34 may include various kinds of laser beam emitting element. For example, the laser beam emitter 34 may include a semiconductor laser, a gas laser, and/or a solid-state laser. The laser beam emitter 34 may be configured to generate the laser beam with another technique. The laser beam emitter 34 is configured to polarize the laser beam in a vertical direction, to thereby emit a vertical laser beam 120 outward of the laser marker 10. The vertical laser beam 120 indicates a vertical reference line.

The rotation body 12 may include a fifth emitter in addition to the first to the fourth emitters 5 to 8. The fifth emitter emits a horizontal laser beam outward of the rotation body 12. The horizontal laser beam indicates a horizontal reference line. The rotation body 12 may include at least one additional emitter, in addition to the fifth emitter, in accordance with a beam divergence of the horizontal laser beam. The at least one additional emitter emits a horizontal laser beam. If each horizontal laser beam has a beam divergence of about 110° and the rotation body 12 includes three additional emitters as well as the fifth emitter, the rotation body 12 can emit four horizontal laser beams that overlap with one another, ranging 360° (the full sphere).

In FIG. 1, the vertical laser beam 120 is emitted across a range from the floor 101 to a wall surface 102. The vertical laser beam 120 is emitted from the first emitter 5 of the laser marker 10, which is placed on the floor 101. Furthermore, in FIG. 1, the vertical laser beam 120 is emitted along a ground marker line 130. The laser marker 10 may emit a downward laser beam 140 toward a lower side of the center axis L1 (in other words, a direction toward the placement surface). The ground marker line 130 is provided on the floor 101.

The laser marker 10 has multiple operation modes. The multiple operation modes include a remote controlling mode and an automatic tracking mode. When the laser marker 10 is placed in the remote controlling mode, a user of the laser marking system 1 uses the portable terminal device 51 or the beam receiving device 60 as a remote controller, to thereby change a position and/or an intensity of the vertical laser beam 120, and/or drive the selected number of emitter(s) among the first to the fourth emitters. In the remote controlling mode, the portable terminal device 51 or the beam receiving device 60 transmits a remote controlling signal to the laser marker 10 in accordance with a manipulation of the user. The rotation body 12 rotates in accordance with the remote controlling signal.

In contrast, when the laser marker 10 is placed in the automatic tracking mode, the laser marker 10 automatically changes the position of the vertical laser beam 120, to thereby adjust the position of the vertical laser beam 120 to a reference position. The reference position is determined in a laser beam receiver 65 of the beam receiving device 60, which will be described later. In the automatic tracking mode, a beam receiving position signal is automatically transmitted from the beam receiving device 60 to the laser marker 10 in accordance with a receiving position (beam receiving position) of the vertical laser beam 120. The rotation body 12 rotates in accordance with the beam receiving position signal. The beam receiving position signal commands the rotation body 12 of the laser marker 10 to stop, rotate clockwise, or rotate counterclockwise in accordance with a rotational position of the rotation body 12. The rotational position of the rotation body 12 corresponds to the reference position, a leftward position to the reference position, or a rightward position to the reference position.

The laser marker 10 includes a device communicator 21. As shown in FIG. 2, the device communicator 21 includes a first device communicator 21a and a second device communicator 21b. The first device communicator 21a performs a wireless communication (hereinafter, referred to as first wireless communication) in accordance with a first communication protocol (or method). The second device communicator 21b performs a wireless communication (hereinafter, referred to as second wireless communication) in accordance with a second communication protocol (or method). The second communication protocol is distinct from the first communication protocol.

The second device communicator 21b transmits and receives various information to and from the portable terminal device 51. The first device communicator 21a receives the signal (the remote controlling signal, the beam receiving position signal, or the like) transmitted from the beam receiving device 60. The second communication protocol includes a near field wireless communication protocol (or method). The near field wireless communication protocol is, for example, a protocol that conforms to a standard for Bluetooth (Registered Trademark). The first communication protocol is, for example, a protocol that conforms to a standard for infrared communication. In the present embodiment, the Bluetooth protocol is used as the second communication protocol and the infrared communication protocol is used as the first communication protocol.

The first device communicator 21a receives an infrared light transmitted from the beam receiving device 60 and then photoelectrically converts the infrared light into an electrical signal. The first device communicator 21a extracts a first positional signal, the remote controlling signal, and/or the beam receiving position signal from the converted electrical signal. The first device communicator 21a transmits the extracted first positional signal, the extracted remote controlling signal, and/or the extracted beam receiving position signal into the support body 11. The first positional signal indicates a center position, a left position, or a right position in a laser beam receiving window 80 (the details of which will be given later) of the beam receiving device 60.

In another embodiment, the first device communicator 21a may be removed from the device communicator 21. In other words, the device communicator 21 may include only the second device communicator 21b. In this case, the first communication protocol conforms to the same communication standard as the second communication protocol and is applied with a modulation that is distinct from a modulation in the second communication protocol. Alternately, in another embodiment, the second device communicator 21b may be removed from the device communicator 21 instead of the first device communicator 21a.

<1-3. Portable Terminal Device>

The portable terminal device 51 includes a function to remotely manipulate the laser marker 10 through a wireless communication. For example, the portable terminal device 51 includes a remote rotation function and a remote laser control function. Additionally, the portable terminal device 51 includes a function to start an automatic tracking.

The remote rotation function rotates the laser marker 10 (specifically, the rotation body 12). The remote laser control function controls the first to the fourth emitters 5 to 8 of the laser marker 10. Thus, the user can remotely manipulate the laser marker 10 via the portable terminal device 51.

The portable terminal device 51 includes a terminal communicator 59 (see, FIG. 2). The terminal communicator 59 performs the second wireless communication with the second device communicator 21b of the laser marker 10, to thereby transmit and receive various information to and from the second device communicator 21b. The terminal communicator 59 transmits, for example, a device manipulation signal. The device manipulation signal includes the remote controlling signal and/or an automatic tracking start command signal. The automatic tracking start command signal demands a start of the automatic tracking. Furthermore, the terminal communicator 59 receives, for example, a device information signal. The device information signal corresponds to (or is related to or is associated with) a signal indicating information relating to the laser marker 10. The device information signal includes a second positional signal (the details of which will be given later) that corresponds to the first positional signal.

<1-4. Beam Receiver>

The beam receiving device 60 includes a function to remotely manipulate the laser marker 10 through a wireless communication. The beam receiving device 60 includes, for example, a remote rotation function and a remote laser control function.

The beam receiving device 60 includes a transmitter 67 and the laser beam receiving window 80. The transmitter 67 performs the first wireless communication with the first device communicator 21a of the laser marker 10, to thereby transmit the remote controlling signal and/or the beam receiving position signal to the first device communicator 21a.

The laser beam receiving window 80 has a rectangular shape. The laser beam receiving window 80 is configured to allow incidence of the vertical laser beam 120 from the laser marker 10 into the beam receiving device 60. In response to the vertical laser beam 120 entering or having entered the laser beam receiving window 80, the laser beam receiver 65 (see, FIG. 2) receives the vertical laser beam 120.

The laser beam receiver 65 is arranged inside the beam receiving device 60. The laser beam receiver 65 is configured into a rectangular shape. The laser beam receiver 65 includes a right beam receiving element 65a and a left beam receiving element 65b. The right beam receiving element 65a and the left beam receiving element 65b may be of the same kind, such as a light receiving diode. The right beam receiving element 65a is arranged rightward of a center line CL. The left beam receiving element 65b is arranged leftward of the center line CL. The center line CL corresponds to the center line (or center position) of the laser beam receiving window 80 and the laser beam receiver 65 in a horizontal direction. That is, the center line CL corresponds to the reference position. The right beam receiving element 65a and the left beam receiving element 65b are in contact with each other on the center line CL.

The beam receiving device 60 is placed on the placement surface such that the center line CL is aligned with the ground marker line 130. When an amount of light received on a right side is greater than an amount of light received on a left side in the beam receiving device 60, the vertical laser beam 120 deviates rightward of the center. The amount of light received on the right side corresponds to an amount of light received by the right beam receiving element 65a. The amount of light received on the left side corresponds to an amount of light received by the left beam receiving element 65b. When the respective amounts of light received on the right side and the left side are equal to each other, the vertical laser beam 120 is located at the center. In other words, the vertical laser beam 120 is aligned with the ground marker line 130. When the amount of light received on the right side is less than the amount of light received on the left side, the vertical laser beam 120 deviates leftward of the center.

The first positional signal indicates a receiving position of the vertical laser beam 120 in the laser beam receiving window 80. When the vertical laser beam 120 is located at the center position, the first positional signal indicates the center position. When the vertical laser beam 120 is located rightward of the center position, the first positional signal indicates the rightward position. When the vertical laser beam 120 is located leftward of the center position, the first positional signal indicates the leftward position.

<2. Electrical Configuration>

<2-1. Laser Marker>

Descriptions are given to an electrical configuration of the laser marking system 1 with reference to FIG. 2.

Figure 3:
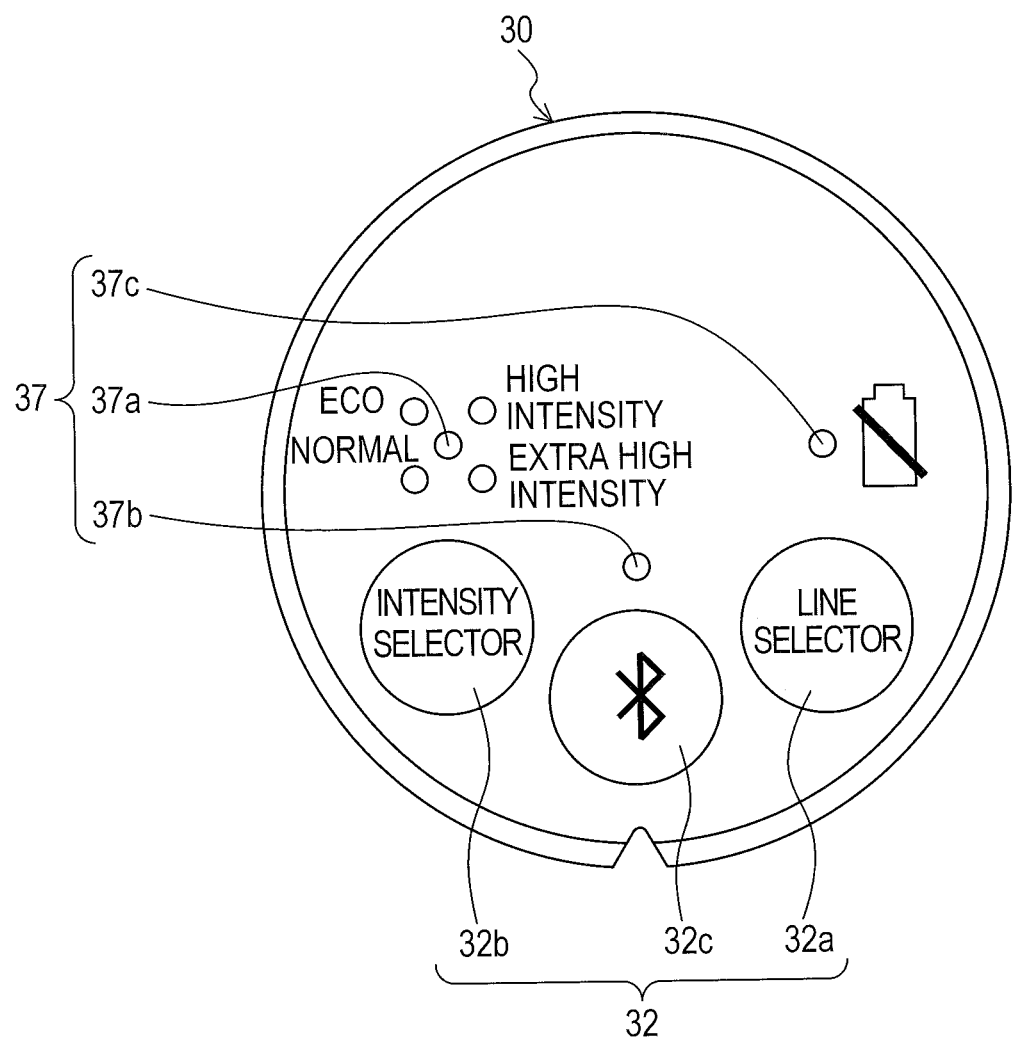
FIG. 3 is a diagram showing an appearance of a user interface of a laser marker according to the present embodiment.

The laser marker 10 includes a device controller 31, a device manipulator 32, a laser driving circuit 33, the laser beam emitter 34, a motor driving circuit 35, a motor 36, a device display 37, the device communicator 21, and a battery 41. In another embodiment, at least one of the device controller 31, the device manipulator 32, the laser driving circuit 33, the laser beam emitter 34, the motor driving circuit 35, the motor 36, the device display 37, the device communicator 21, or the battery 41 may be removed from the laser marker 10. As shown in FIG. 3, the device manipulator 32 and the device display 37 are provided to the user interface 30.

The device controller 31 includes a CPU 31a, a memory 31b, an input/output (I/O) port, and the like. The device controller 31 may be, for example, in the form of a microcomputer. The CPU 31a executes various programs stored in the memory 31b, whereby the device controller 31 achieves functions.

The device manipulator 32 includes a line selection manipulator 32a, an intensity selection manipulator 32b, and a wireless communication manipulator 32c. In another embodiment, at least one of the line selection manipulator 32a, the intensity selection manipulator 32b, or the wireless communication manipulator 32c may be removed from the device manipulator 32.

The laser marker 10 includes a first to a third lighting modes. The line selection manipulator 32a is a switch to select one of the lighting modes of the laser marker 10. In the first lighting mode, only the first emitter 5 may be turned on. In the second lighting mode, both the second emitter 6 and the fourth emitter 8 may be turned on. In the third lighting mode, all the emitters from the first to the fourth emitters 5 to 8 may be turned on. In another embodiment, at least one additional lighting mode may be provided. Furthermore, at least one of the first to the third lighting modes may be removed. The first to the fourth emitters 5 to 8 may be turned on in any manner. The laser marker 10 switches various kinds of lighting mode in a specified order every time the line selection manipulator 32a is manipulated.

The laser marker 10 includes four kinds of intensity mode. The four kinds of intensity mode have respective different brightness of the laser beam emitted from the laser marker 10. The intensity selection manipulator 32b is a switch to select one of the intensity modes. The four kinds of intensity mode include, for example, an eco-mode, a normal mode, a high intensity mode, and an extra high intensity mode.

The wireless communication manipulator 32c is a switch to connect the laser marker 10 to the portable terminal device 51 through the second wireless communication. The second device communicator 21b is configured to establish a communication path of the second wireless communication between the laser marker 10 and the portable terminal device 51, which exists within a wireless communication area, in response to the wireless communication manipulator 32c being manipulated or having been manipulated. The wireless communication area corresponds to a wirelessly-communicable area for the second device communicator 21b.

The laser driving circuit 33 causes the laser beam emitter 34 to emit the laser beam with a pulse drive. The pulse drive allows the vertical laser beam 120 to be emitted in an intermittent manner, not in a continuous manner. The laser driving circuit 33 causes the laser beam emitter 34 to emit the laser beam in a constant cycle at a specified duty ratio. A cycle of the pulse drive may be appropriately determined. In the present embodiment, the cycle of the pulse drive is set to the extent (for example, 0.2 msec or less) an afterimage effect allows the user to visually identify the vertical laser beam 120 as being continuously emitted.

The motor driving circuit 35 drives the motor 36. The motor driving circuit 35 controls a driving current flowing through the motor 36 based on a drive signal output from the device controller 31. The device controller 31 generates a drive signal based on the remote controlling signal transmitted from the portable terminal device 51 or the beam receiving device 60. Alternately, the device controller 31 generates a drive signal based on the beam receiving position signal transmitted from the beam receiving device 60. The motor driving circuit 35 may be in the form of a H-bridge circuit in one example.

The motor 36 may be, for example, in the form of a DC brushed motor. The motor 36 generates a driving force to rotate the rotation body 12 of the laser marker 10. The laser marker 10 may include an additional motor to generate an additional driving force in addition to the driving force required for a rotational motion of the rotation body 12. The motor 36 may be in the form of a three-phase brushless motor or a stepper motor.

The device display 37 shows a state of the laser marker 10. As shown in FIG. 3, the device display 37 includes an intensity display 37a, a wireless communication display 37b, and a battery state display 37c. In another embodiment, at least one of the intensity display 37a, the wireless communication display 37b, or the battery state display 37c may be removed from the device display 37.

The intensity display 37a lights on in green in the eco-mode, lights off in the normal mode, lights on in orange in the high intensity mode, and lights on in red in the extra intensity mode. The wireless communication display 37b lights on in response to the wireless communication manipulator 32c being placed or having been placed in an ON state and the laser marker 10 being wirelessly connected or having been wirelessly connected to the portable terminal device 51. The wireless communication display 37b blinks in response to the wireless communication manipulator 32c being placed or having been placed in the ON state and the laser marker 10 being wirelessly unconnected or having been wirelessly unconnected to the portable terminal device 51. The wireless communication display 37b lights off in response to the wireless communication manipulator 32c being placed or having been placed in an OFF state. The battery state display 37c lights on when a remaining electric energy of the battery 41 is below a specified threshold and lights off when the remaining electric energy is above the threshold or more.

The battery 41 is a power source to supply an electric power to the laser marker 10. The battery 41 is detachably attached to the laser marker 10. The battery 41 includes a rechargeable battery. When the remaining electric energy of the battery 41 decreases, the battery 41 is replaced with another battery, whereby the laser marker 10 can operate continuously. The battery 41 may include a non-rechargeable battery in addition to or in replacement of the rechargeable battery.

<2-2. Portable Terminal Device>

The portable terminal device 51 includes a terminal controller 53, a terminal manipulator 54, a terminal display 57, a vibrator 56, a speaker 58, and the terminal communicator 59. In another embodiment, at least one of the terminal controller 53, the terminal manipulator 54, the terminal display 57, the vibrator 56, the speaker 58, or the terminal communicator 59 may be removed from the portable terminal device 51.

The terminal controller 53 includes a CPU 53a, a memory 53b, an I/O port, and the like. The terminal controller 53 may be, for example, in the form of a microcomputer. The CPU 53a executes various programs stored in the memory 53b, whereby the terminal controller 53 achieves functions.

The CPU 53a may be configured to execute a program code encoded in a tangible computer readable medium. The computer readable medium refers to any medium that can provide the portable terminal device 51 with a data to operate the portable terminal device 51 in a specified method. Various computer readable mediums may be used to provide the CPU 53a with a command to be executed by the CPU. A general type of the computer readable medium includes, for example, a magnetic medium, an optical medium, a physical medium, a memory chip or a memory cartridge, a carrier wave, and any other computer readable mediums. Examples of the computer readable medium may include a volatile medium, a non-volatile medium, or a transmission medium. The volatile medium and the non-volatile medium may be embodied by any method or technique to store information (for example, a computer readable command, a data structure, a program module, or other data described in details below). The transmission medium may be a coaxial cable, a copper wire, and/or an optical fiber cable, and a sound wave or an electromagnetic wave (including a radio wave and an optical wave). The tangible computer readable storage medium may be, for example, an integrated circuit (for example, a field programmable gate array or an application specific IC), a hard disc, an optical disc, an optical magnetic disc, a floppy disc, a magnetic tape, a holographic memory medium, a solid state device, a RAM, a ROM, an electrically erasable programmable read-only memory (EEPROM), a flash memory or other memory technology, a CD-ROM, a digital versatile disc (DVD) or other optical storages, and a magnetic tape in cassette form, a magnetic tape, a magnetic disc memory or other magnetic storages.

The terminal manipulator 54 includes a touch screen. The touch screen is configured such that the user directly touches the touch screen with a finger or a thumb, to thereby perform an input manipulation. The touch screen transmits a signal to the terminal controller 53 in accordance with the input manipulation by the user.

The terminal display 57 includes a display panel. The display panel provides an image in accordance with a display command signal from the terminal controller 53. The display panel may be, for example, in the form of a liquid crystal panel or an organic electroluminescence (EL) panel.

The terminal manipulator 54 and the terminal display 57 may be configured with a liquid crystal display (LCD) with a touch screen. Alternatively, the terminal manipulator 54 and the terminal display 57 may be configured with an organic EL display with a touch screen.

The vibrator 56 outputs a vibration in accordance with a vibration output command signal from the terminal controller 53. The memory 53b stores multiple patterns of vibration. The terminal controller 53 outputs the vibration output command signal in accordance with a selected vibration pattern.

The speaker 58 outputs a buzzing sound in accordance with a sound output command signal from the terminal controller 53. The memory 53b stores multiple patterns of buzzing sound. The terminal controller 53 outputs the sound output command signal in accordance with a selected sound pattern. The speaker 58 may outputs a voice or music in accordance with the sound output command signal from the terminal controller 53.

The terminal controller 53 sets an output limitation on the vibrator 56 and/or the speaker 58 in response to the user selecting or having selected the output limitation on the vibrator 56 and/or the speaker 58. The output limitation is set by, for example, the user selecting a vibration mode or a silent mode. In response to the terminal controller 53 setting or having set the output limitation, an output stop of the speaker 58 and/or the vibrator 56 is set. For example, if the vibration mode is selected in the portable terminal device 51, then output stop (that is, sound-OFF) of the speaker 58 is set.

<2-3. Beam Receiving Device>

The beam receiving device 60 includes a beam reception controller 61, a beam reception manipulator 64, the laser beam receiver 65, the transmitter 67, a remote control/tracking selector switch 66, and a beam receiving position indicator 71. In another embodiment, at least one of the beam reception controller 61, the beam reception manipulator 64, the laser beam receiver 65, the transmitter 67, the remote control/tracking selector switch 66, or the beam receiving position indicator 71 may be removed from the beam receiving device 60.

The beam reception controller 61 includes a CPU 61a, a memory 61b, an I/O port, and the like. The beam reception controller 61 may be, for example, in the form of a microcomputer. The CPU 61a executes various programs stored in the memory 61b, whereby the beam reception controller 61 achieves functions.

The beam reception manipulator 64 includes a counter-clockwise rotation switch 64a and a clockwise rotation switch 64b. In another embodiment, the counterclockwise rotation switch 64a or the clockwise rotation switch 64b may be removed from the beam reception manipulator 64. The counterclockwise rotation switch 64a rotates the rotation body 12 counterclockwise in the remote controlling mode. The clockwise rotation switch 64b rotates the rotation body 12 clockwise in the remote controlling mode.

In response to receipt of the laser beam, the laser beam receiver 65 transmits a beam reception signal to the beam reception controller 61. Specifically, the laser beam receiver 65 transmits the beam reception signal to the beam reception controller 61 in response to the vertical laser beam 120 entering or having entered the laser beam receiving window 80.

The beam receiving position indicator 71 includes a first LED 71a, a second LED 71b, and a third LED 71c. The beam receiving position indicator 71 notifies of the receiving position of the laser beam. In another embodiment, at least one of the first LED 71a, the second LED 71b, or the third LED 71c may be removed from the beam receiving position indicator 71. The first LED 71a, the second LED 71b, and the third LED 71c are horizontally aligned with each other in this order from the right side as viewed from the laser marker 10. The first LED 71a lights on in orange when the receiving position of the laser beam is the rightward position. The second LED 71b lights on in green when the receiving position of the laser beam is the center position. The third LED 71c lights on in red when the receiving position of the laser beam is the leftward position.

<3. Beam Receiving Position Process>

Descriptions are given to a beam receiving position notification process executed by the laser marking system 1 with reference to FIGS. 7A to 7D. The laser marking system 1 executes the beam receiving position notification process so as to notify the user of the receiving position of the laser beam in the beam receiving device 60. The beam receiving position notification process is executed with the user remotely manipulating the laser marker 10 via the portable terminal device 51. Execution of the beam receiving position notification process is started by the user selecting a beam reception confirmation function in the portable terminal device 51. The beam receiving position notification process is repeatedly executed with the beam reception confirmation function remained selected.

Figure 4:
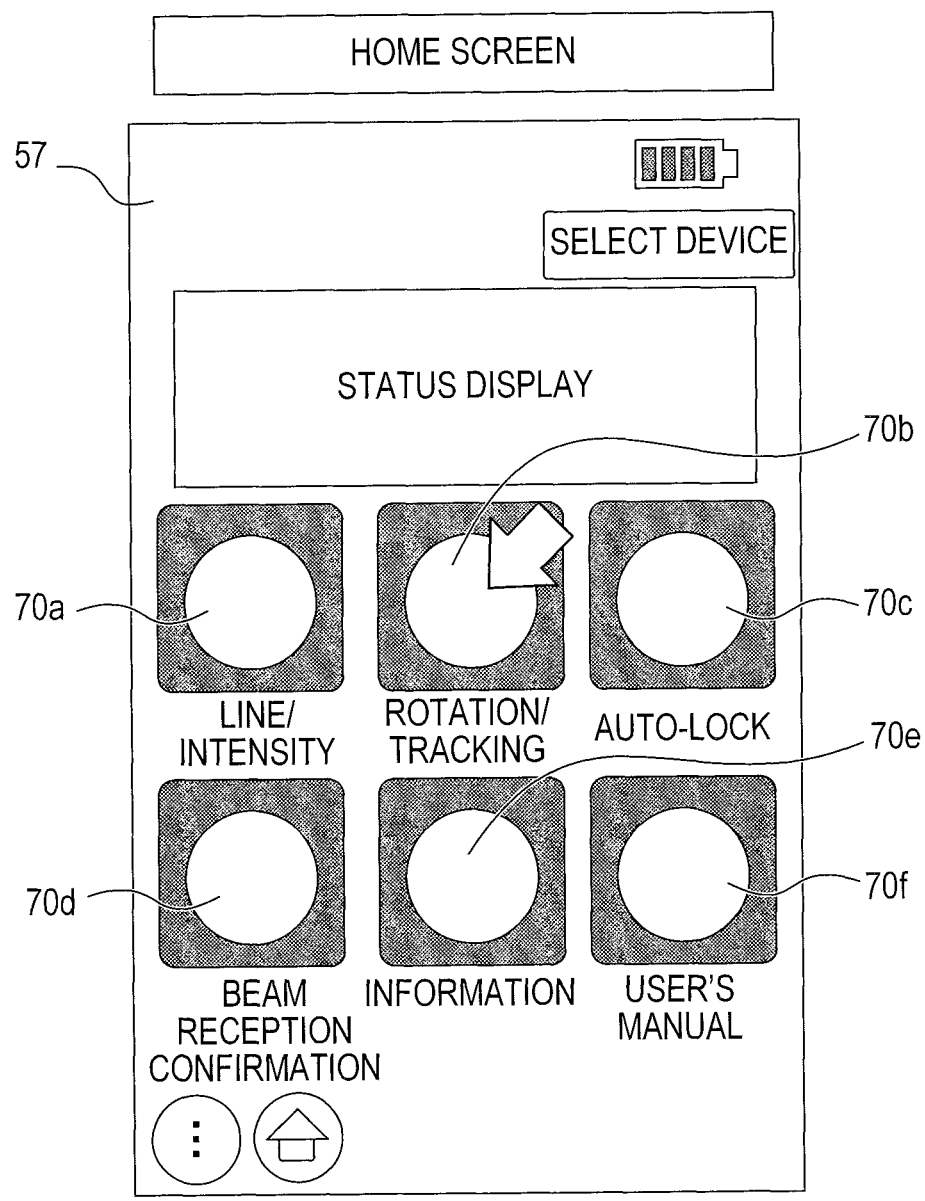
FIG. 4 is a diagram showing a home screen of a portable terminal device according to the present embodiment.

First, the user causes the terminal display 57 to show the home screen (see, FIG. 4). The home screen includes a line/intensity icon 70a, a rotation/tracking icon 70b, an auto-lock icon 70c, a beam reception confirmation icon 70d, an information icon 70e, and a user's manual icon 70f. The user selects the beam reception confirmation icon 70d in the home screen to confirm the receiving position of the laser beam.

If the beam reception confirmation icon 70d is selected, then the terminal controller 53 receives a "beam reception confirmation" signal and causes the terminal display 57 to show a beam reception confirmation screen in S10. The beam reception confirmation screen includes a beam receiving position indicator 73 and a notification selector 72 (see, FIG. 5).

The beam receiving position indicator 73 includes a first positional indicator 73a, a second positional indicator 73b, and a third positional indicator 73c. The first positional indicator 73a, the second positional indicator 73b, and the third positional indicator 73c are horizontally aligned with each other in this order from a right side of the beam reception confirmation screen. The first positional indicator 73a, the second positional indicator 73b, and the third positional indicator 73c, respectively, include an orange frame, a green frame, and a red frame (in FIG. 5, the orange frame is indicated in a dotted line, the green frame is indicated in a broken line, and the red frame is indicated in a dotted-dash line).

The inside of the orange frame of the first positional indicator 73a turns orange if the second positional signal, which is received by the terminal communicator 59 from the second device communicator 21b, indicates the rightward position. The inside of the green frame of the second positional indicator 73b turns green if the second positional signal indicates the center position. The inside of the red frame of the third positional indicator 73c turns red if the second positional signal indicates the leftward position. That is, the first positional indicator 73a, the second positional indicator 73b, and the third positional indicator 73c, respectively, correspond to the first LED 71a, the second LED 71b, and the third LED 71c of the beam receiving device 60. In the present embodiment, the beam receiving position indicator 73, the vibrator 56, and the speaker 58 correspond to one example of the notifier in the present disclosure.

The notification selector 72 includes a vibration-OFF selector 72a, a vibration-ON selector 72b, a sound-OFF selector 72c, and a sound-ON selector 72d. In another embodiment, at least one of the vibration-OFF selector 72a, the vibration-ON selector 72b, the sound-OFF selector 72c, or the sound-ON selector 72d may be removed from the notification selector 72. The vibration-OFF selector 72a is provided for a selection of not using a vibration in notifying of the beam receiving position. If the vibration-OFF selector 72a is selected by the user, then a vibration output indicating the beam receiving position is set to OFF. Consequently, the vibration output from the vibrator 56 stops. The sound-OFF selector 72c is provided for a selection of not using a sound in notifying of the beam receiving position. If the sound-OFF selector 72c is selected by the user, then a sound output indicating the beam receiving position is set to OFF. Consequently, the sound output from the speaker 58 stops.

The vibration-ON selector 72b is provided for a selection of using a vibration in notifying of the beam receiving position in addition to an indication of the beam receiving position via the beam receiving position indicator 73. If the vibration-ON selector 72b is selected by the user, then a vibration indicating the beam receiving position is output from the vibrator 56. The sound-ON selector 72d is provided for a selection of using a sound in notifying of the beam receiving position in addition to the indication of the beam receiving position via the beam receiving position indicator 73. If the sound-ON selector 72d is selected by the user, then a buzzing sound indicating the beam receiving position is output from the speaker 58.

However, even if the vibration-ON selector 72b and/or the sound-ON selector 72d are/is selected, a priority is given to output limitation(s) on the vibrator 56 and/or the speaker 58 set in the portable terminal device 51. Specifically, (i) if the vibration-ON selector 72b is selected (ii) with the output limitation on the vibrator 56 set in the portable terminal device 51, then the vibration output is set to OFF. Furthermore, (i) if the sound-ON selector 72d is selected with the output limitation on the speaker 58 set in the portable terminal device 51, then the sound output is set to OFF. For example, (i) if the sound-ON selector 72d is selected with the vibration mode set, then the sound output is set to OFF.

Figure 7A:
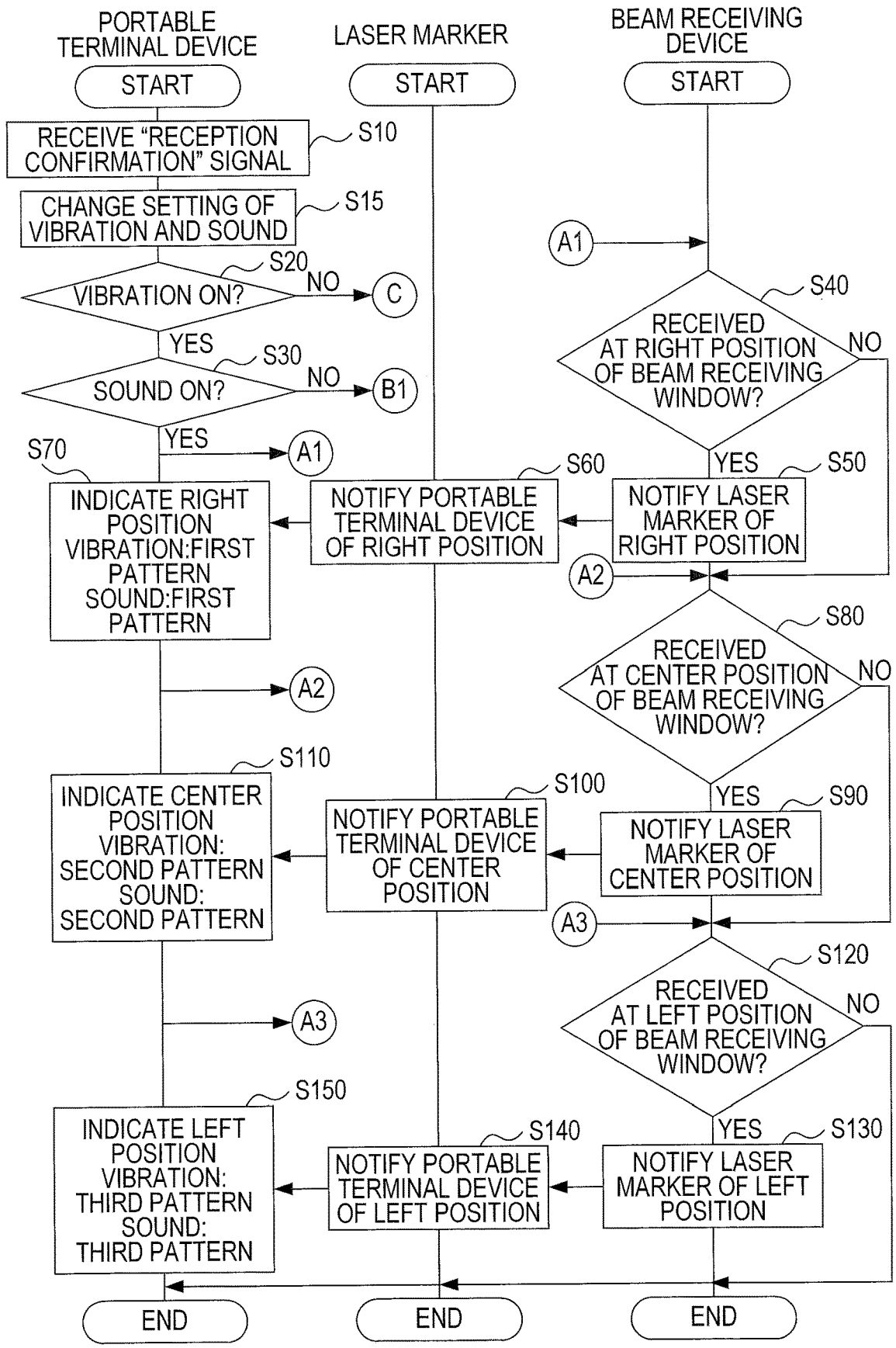
FIG. 7A is a flow chart showing a part of a beam receiving position notification process according to the present embodiment.
Figure 7B:
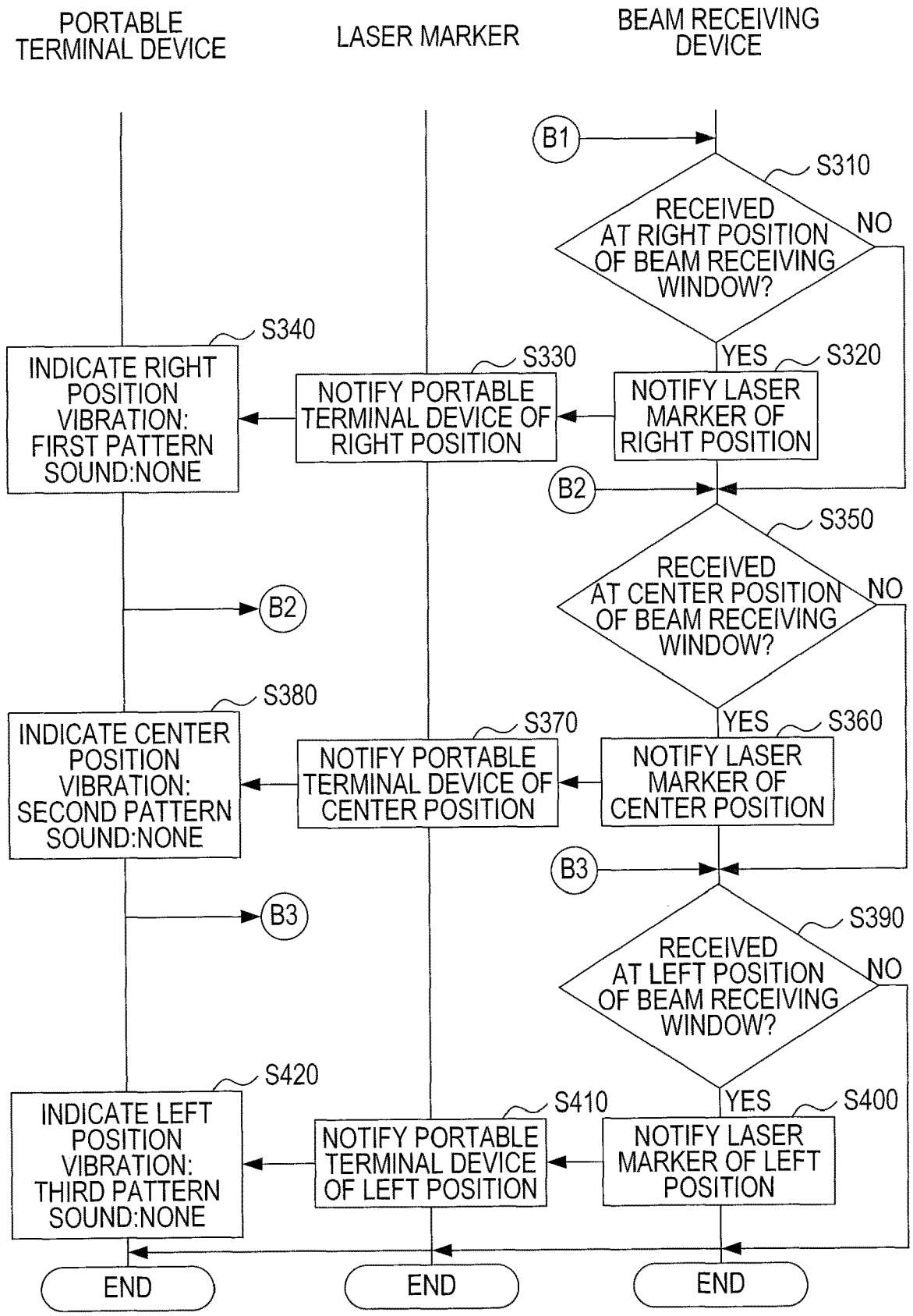
FIG. 7B is a flow chart showing another part of the beam receiving position notification process.
Figure 7C:
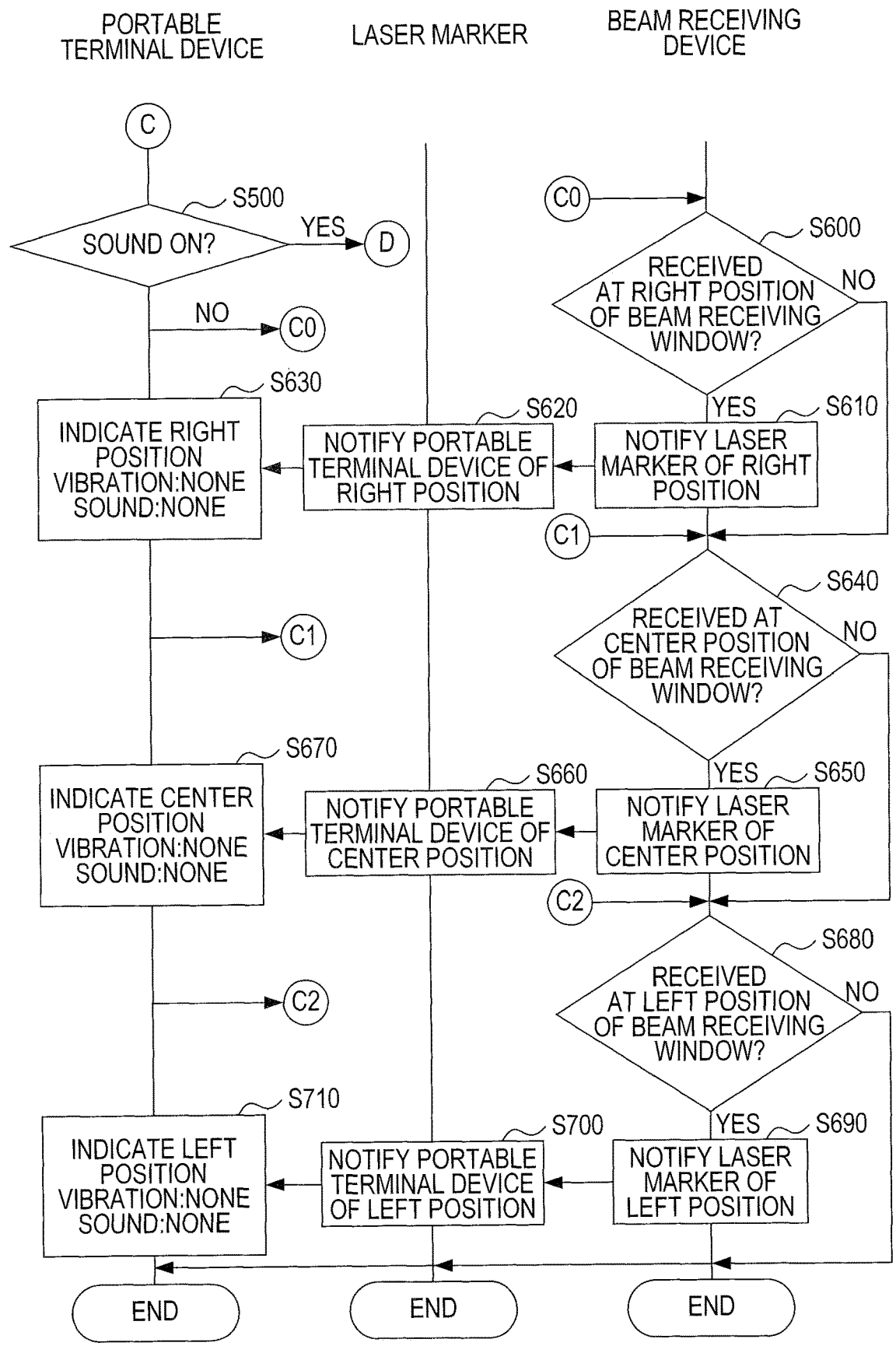
FIG. 7C is a flow chart showing still another part of the beam receiving position notification process.
Figure 7D:
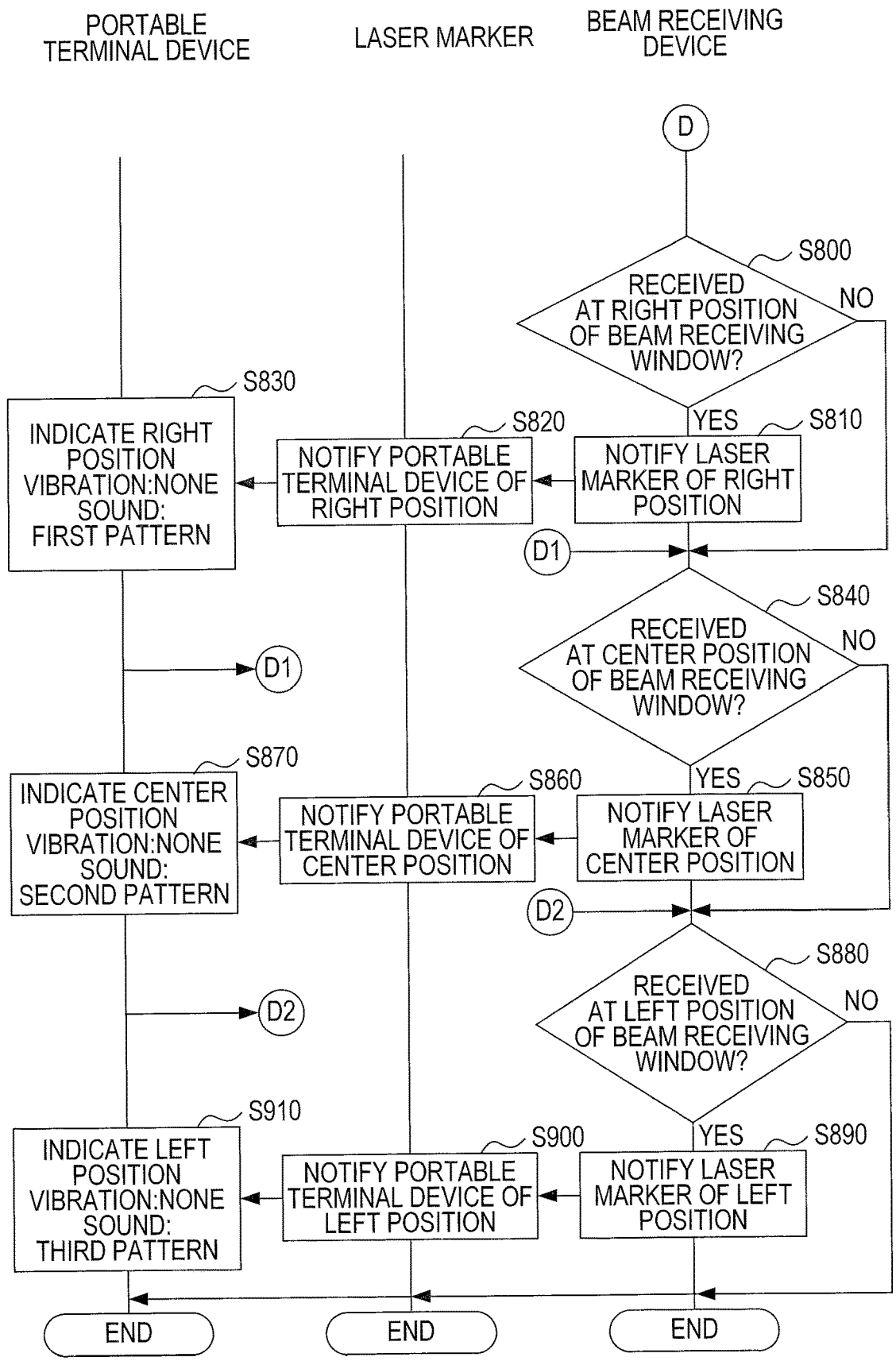
FIG. 7D is a flow chart showing the reset of the beam receiving position notification process.

Referring now to FIG. 7A, in S15, the terminal controller 53 changes an ON/OFF setting of the vibration output and an ON/OFF setting of the sound output in accordance with the user's selection(s) from the notification selector 72 and the output limitation(s) on the vibrator 56 and/or the speaker 58.

Subsequently, in S20, the terminal controller 53 determines whether the vibration output is ON. If a determination is made that the vibration output is ON (S20: YES), then the terminal controller 53 proceeds to a process of S30.

In S30, the terminal controller 53 determines whether the sound output is ON. If a determination is made in S30 that the sound output is ON (S30: YES), then the terminal controller 53 proceeds to a process of S40.

In S40, the beam reception controller 61 determines whether the receiving position of the laser beam in the laser beam receiving window 80 is the rightward position. If a determination is made in S40 that the beam receiving position is the rightward position (S40: YES), then the beam reception controller 61 proceeds to a process of S50.

In S50, the beam reception controller 61 transmits the first positional signal to the first device communicator 21a via the transmitter 67. The first positional signal indicates the rightward position.

Subsequently, in S60, the device controller 31 transmits the second positional signal to the terminal communicator 59 via the second device communicator 21b. The second positional signal indicates the rightward position. The second positional signal is generated by converting the first positional signal generated in accordance with the first communication protocol. The conversion is performed in accordance with the second communication protocol.

Figure 5:
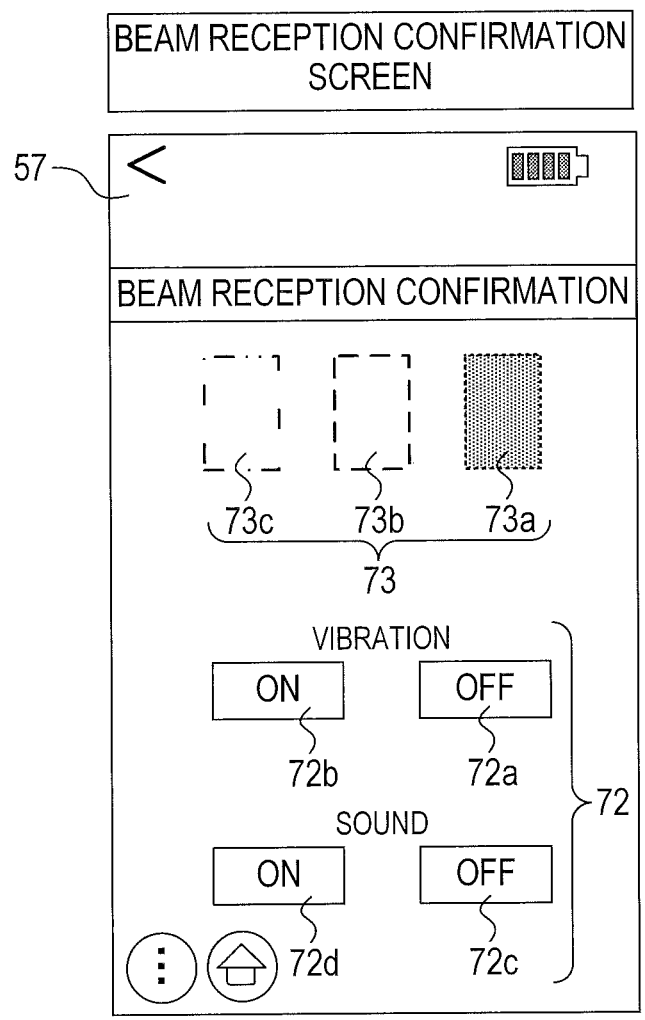
FIG. 5 is a diagram showing a beam reception confirmation screen of the portable terminal device.

Subsequently, in S70, the terminal controller 53 notifies of the rightward position. Specifically, the terminal controller 53 turns the inside of the orange frame of the first positional indicator 73a orange in the beam reception confirmation screen (FIG. 5 shows that the inside of the orange frame of the first positional indicator 73a has turned orange). Also, the terminal controller 53 causes the vibrator 56 to output a first patterned vibration. The first patterned vibration indicates the rightward position. The terminal controller 53 further outputs a first patterned buzzing sound from the speaker 58. The first patterned buzzing sound indicates the rightward position. In replacement of the buzzing sound, the terminal controller 53 may output a voice message from the speaker 58 to notify the user that the beam receiving position is the rightward position.

Notifications from the portable terminal device 51 enables the user to identify the beam receiving position even if the user is unable to visually confirm the beam receiving position indicator 71 of the beam receiving device 60. When the user identifies that the beam receiving position deviates rightward of the center position, the user adjusts the laser beam such that the beam receiving position coincides with the center position. Specifically, the user causes the terminal display 57 to show the home screen to select the rotation/tracking icon 70b. In response to selection of the rotation/tracking icon 70b, the terminal display 57 shows the rotation/tracking screen.

Figure 6:
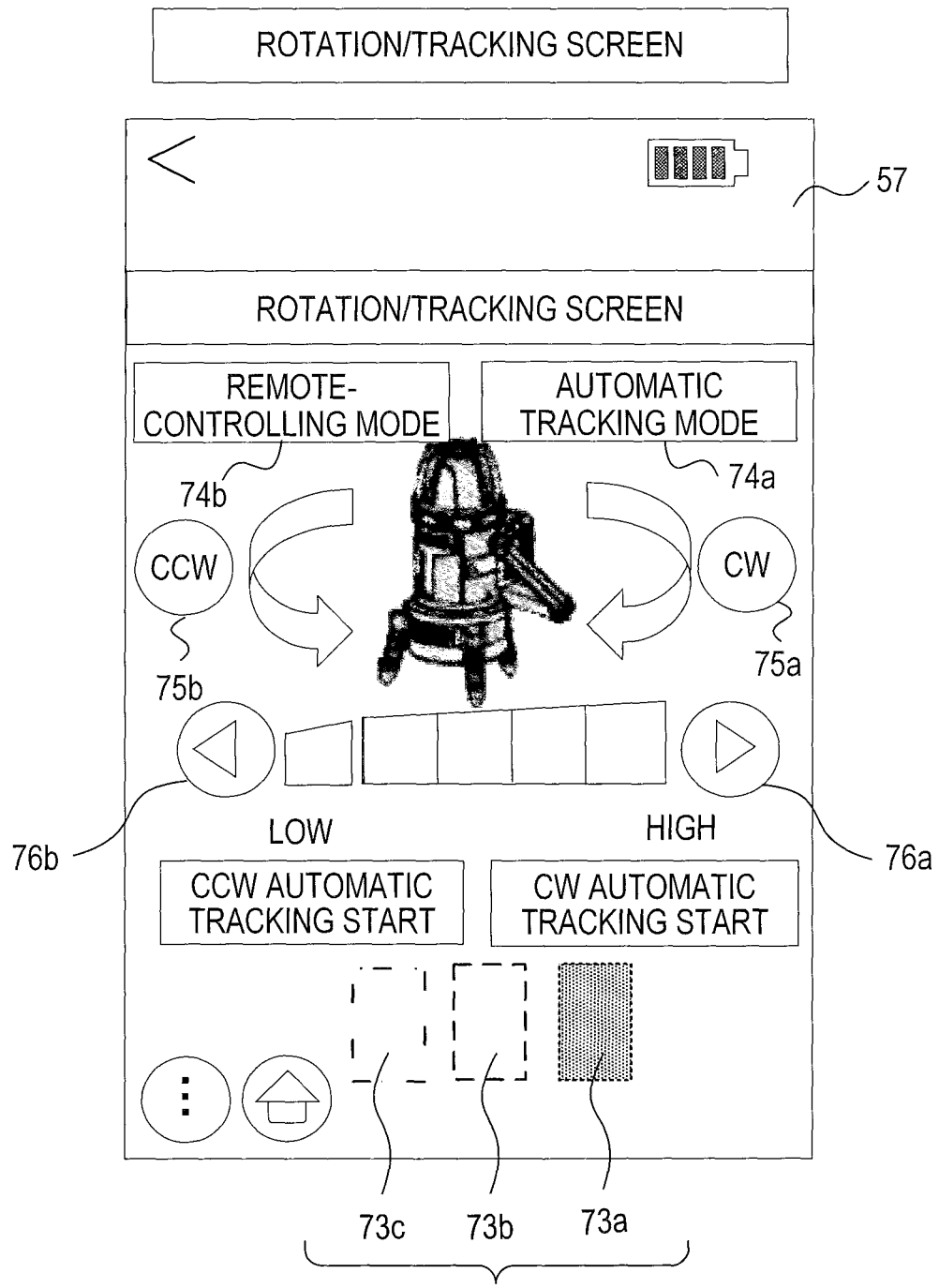
FIG. 6 is a diagram showing a rotation/tracking screen of the portable terminal device.

The rotation/tracking screen includes an automatic tracking mode selector 74a, a remote controlling mode selector 74b, a clockwise rotation selector 75a, a counterclockwise rotation selector 75b, an acceleration selector 76a, a deceleration selector 76b, and the beam receiving position indicator 73 (see, FIG. 6). In another embodiment, at least one of the automatic tracking mode selector 74a, the remote controlling mode selector 74b, the clockwise rotation selector 75a, the counterclockwise rotation selector 75b, the acceleration selector 76a, the deceleration selector 76b, or the beam receiving position indicator 73 may be removed from the rotation/tracking screen.

The remote controlling mode selector 74b is selected by the user. Then, the clockwise rotation selector 75a or the counterclockwise rotation selector 75b is selected in accordance with the beam receiving position, to thereby rotate the rotation body 12 and adjust the position of the laser beam. The acceleration selector 76a and the deceleration selector 76b adjust a rotation speed of the rotation body 12. Instead of remotely manipulating the laser marker 10 via the portable terminal device 51, the laser marker 10 may be directly manipulated by the user to adjust the position of the laser beam.

If a determination is made in S40 that the beam receiving position is not the rightward position (S40: NO), then the beam reception controller 61 proceeds to a process of S80.

In S80, the beam reception controller 61 determines whether the beam receiving position is the center position. If a determination is made in S80 that the beam receiving position is the center position (S80: YES), then the beam reception controller 61 proceeds to a process of S90.

In S90, the beam reception controller 61 transmits the first positional signal to the first device communicator 21a via the transmitter 67. The first positional signal indicates the center position.

Subsequently, in S100, the device controller 31 transmits the second positional signal to the terminal communicator 59 via the second device communicator 21b. The second positional signal indicates the center position.

Subsequently, in S110, the terminal controller 53 informs of the center position. Specifically, the terminal controller 53 turns the inside of the green frame of the second positional indicator 73b green in the beam reception confirmation screen. Furthermore, the terminal controller 53 causes the vibrator 56 to output a second patterned vibration. The second patterned vibration indicates the center position. Moreover, the terminal controller 53 causes the speaker 58 to output a second patterned buzzing sound. The second patterned buzzing sound indicates the center position. Consequently, the user can identify that the beam receiving position is the center position and adjustment of the laser beam is thus finished.

If a determination is made in S80 that the beam receiving position is not the center position (S80: NO), then the beam reception controller 61 proceeds to a process of S120.

In S120, the beam reception controller 61 determines whether the beam receiving position is the leftward position. If a determination is made in S120 that the beam receiving position is the leftward position (S120: YES), then the beam reception controller 61 proceeds to a process of S130. If a determination is made that the beam receiving position is not the leftward position (S120: NO), then the beam reception controller 61 ends the beam receiving position notification process.

In S130, the beam reception controller 61 transmits the first positional signal to the first device communicator 21a via the transmitter 67. The first positional signal indicates the leftward position.

Subsequently, in S140, the device controller 31 transmits the second positional signal to the terminal communicator 59 via the second device communicator 21b. The second positional signal indicates the leftward position.

Subsequently, in S150, the terminal controller 53 notifies of the leftward position. Specifically, the terminal controller 53 turns the inside of the red frame of the third positional indicator 73c red in the beam reception confirmation screen. Furthermore, the terminal controller 53 causes the vibrator 56 to output a third patterned vibration. The third patterned vibration indicates the leftward position. Moreover, the terminal controller 53 causes the speaker 58 to output a third patterned buzzing sound. The third patterned buzzing sound indicates the leftward position. Consequently, the user identifies that the beam receiving position is the leftward position and the adjustment of the laser beam is thus required. In this case, the user causes the terminal display 57 to show the rotation/tracking screen as described above, to thereby remotely manipulate the rotation body 12.

If a determination is made in S30 that the sound output is OFF (S30: NO), then the terminal controller 53 proceeds to a process of S310.

In S310 to S330, the beam reception controller 61 and the device controller 31 execute the same processes as in S40 to S60 respectively.

Subsequently, in S340, the terminal controller 53 notifies of the rightward position. Specifically, the terminal controller 53 notifies of the rightward position with the indication of the beam receiving position and the vibration output. The terminal controller 53 turns the inside of the orange frame of the first positional indicator 73a orange in the beam reception confirmation screen. Furthermore, the terminal controller 53 causes the vibrator 56 to output the first patterned vibration indicating the rightward position. The terminal controller 53 causes the speaker 58 to output no buzzing sound.

If a determination is made in S310 that the beam receiving position is not the rightward position (S310: NO), then the beam reception controller 61 proceeds to a process of S350. In S350 to S370, the beam reception controller 61 and the device controller 31 execute the same processes as in S80 to S100 respectively.

Subsequently, in S380, the terminal controller 53 notifies of the center position. Specifically, the terminal controller 53 turns the inside of the green frame of the second positional indicator 73b green in the beam reception confirmation screen. Furthermore, the terminal controller 53 causes the vibrator 56 to output the second patterned vibration indicating the center position. The terminal controller 53 causes the speaker 58 to output no buzzing sound.

If a determination is made in S350 that the beam receiving position is not the center position (S350: NO), the beam reception controller 61 proceeds to a process of S390. In S390 to S410, the beam reception controller 61 and the device controller 31 execute the same processes as in S120 to S140 respectively.

Subsequently, in S420, the terminal controller 53 notifies the leftward position. Specifically, the terminal controller 53 turns the inside of the red frame of the third positional indicator 73c red in the beam reception confirmation screen. Furthermore, the terminal controller 53 causes the vibrator 56 to output a third patterned vibration indicating the leftward position. The terminal controller 53 causes the speaker 58 to output no buzzing sound.

If a determination is made in S20 that the vibration output is OFF (S20: NO), then the terminal controller 53 proceeds to a process of S500.

In S500, the terminal controller 53 determines whether the sound output is ON. If a determination is made in S500 that the sound output is OFF (S500: NO), then the terminal controller 53 proceeds to a process of S600.

In S600 to S620, the beam reception controller 61 and the device controller 31 execute the same processes as in S40 to S60 respectively.

Subsequently, in S630, the terminal controller 53 notifies of the rightward position. Specifically, the terminal controller 53 notifies of the beam receiving position only with the indication of the beam receiving position because the vibration output and the sound output are set to OFF. The terminal controller 53 turns the inside of the orange frame of the first positional indicator 73a orange in the beam reception confirmation screen. The terminal controller 53 causes the vibrator 56 and the speaker 58 to output no vibration and buzzing sound respectively.

If a determination is made in S600 that the beam receiving position is not the rightward position (S600: NO), then the beam reception controller 61 proceeds to a process of S640. In S640 to S660, the beam reception controller 61 and the device controller 31 execute the same processes as in S80 to S100 respectively.

Subsequently, in S670, the terminal controller 53 notifies of the center position. Specifically, the terminal controller 53 turns the inside of the green frame of the second positional indicator 73b green in the beam reception confirmation screen. The terminal controller 53 causes the vibrator 56 and the speaker 58 to output no vibration and buzzing sound respectively.

If a determination is made in S640 that the beam receiving position is not the center position (S640: NO), then the beam reception controller 61 proceeds to a process of S680. In S680 to S700, the beam reception controller 61 and the device controller 31 execute the same processes as in S120 to S140 respectively.

Subsequently, in S710, the terminal controller 53 notifies of the leftward position. Specifically, the terminal controller 53 turns the inside of the red frame of the third positional indicator 73c red in the beam reception confirmation screen. The terminal controller 53 causes the vibrator 56 and the speaker 58 to output no vibration and buzzing sound respectively.

If a determination is made in S500 that the sound output is ON (S500: YES), then the terminal controller 53 proceeds to a process of S800.

In S800 to S820, the beam reception controller 61 and the device controller 31 execute the same processes as in S40 to S60 respectively.

Subsequently, in S830, the terminal controller 53 notifies of the rightward position. Specifically, the terminal controller 53 notifies of the rightward position with the indication of the beam receiving position and the sound output because the vibration output is set to OFF. The terminal controller 53 turns the inside of the orange frame of the first positional indicator 73a orange in the beam reception confirmation screen. Furthermore, the terminal controller 53 causes the speaker 58 to output the first patterned buzzing sound indicating the rightward position. The terminal controller 53 causes the vibrator 56 to output no vibration.

If a determination is made in S800 that the beam receiving position is not the rightward position (S800: NO), then the beam reception controller 61 proceeds to a process of S840. In S840 to S860, the beam reception controller 61 and the device controller 31 executes the same processes as in S80 to S100.

Subsequently, in S870, the terminal controller 53 notifies of the center position. Specifically, the terminal controller 53 turns the inside of the green frame of the second positional indicator 73b green in the beam reception confirmation screen. Furthermore, the terminal controller 53 causes the speaker 58 to output the second patterned buzzing sound indicting the center position. The terminal controller 53 causes the vibrator 56 to output no vibration.

If a determination is made in S840 that the beam receiving position is not the center position (S840: NO), then the beam reception controller 61 proceeds to a process of S880. In S880 to S900, the beam reception controller 61 and the device controller 31 execute the same processes as in S120 to S140 respectively.

Subsequently, in S910, the terminal controller 53 notifies of the leftward position. Specifically, the terminal controller 53 turns the inside of the red frame of the third positional indicator 73c red in the beam reception confirmation screen. Furthermore, the terminal controller 53 causes the speaker 58 to output the third patterned buzzing sound indicating the leftward position. The terminal controller 53 causes the vibrator 56 to output no vibration.

<4. Effects>

The embodiment described above can bring effects to be described below.

(1) In the laser marking system 1, the beam receiving device 60 transmits the first positional signal indicating the receiving position of the laser beam. The first positional signal can be received at a location distanced from the beam receiving device 60. Such a configuration enables the user to identify the beam receiving position and easily adjust the position of the laser beam without approaching closer to the beam receiving device 60.

(2) The portable terminal device 51 notifies of the beam receiving position, whereby the user identifies the receiving position of the laser beam with the portable terminal device 51 in hand. This enables the user to easily adjust the position of the laser beam.

(3) The first positional signal is transmitted from the transmitter 67 to the first device communicator 21a. Furthermore, the second positional signal corresponding to (or is related or is associated with) the first positional signal is transmitted from the second device communicator 21b to the terminal communicator 59. This enables the portable terminal device 51 to receive the beam receiving position via the laser marker 10.

(4) The terminal display 57 shows the beam receiving position. This enables the user to identify the beam receiving position by checking out the terminal display 57. Furthermore, the portable terminal device 51 outputs a sound from the speaker 58 in accordance with the beam receiving position. Also, the portable terminal device 51 outputs a vibration from the vibrator 56 in accordance with the beam receiving position. The sound output and the vibration output enable the user to identify the beam receiving position without checking out the terminal display 57.

(5) If the output limitation(s) are/is set on the speaker 58 and/or the vibrator 56, the portable terminal device 51 gives the priority to the output limitation(s) over the sound output and/or the vibration output indicating the beam receiving position. Thus, it is possible to inhibit the sound and/or the vibration from being output without intention of the user when the user identifies the beam receiving position via the portable terminal device 51.

OTHER EMBODIMENTS

Although an embodiment of the present disclosure has been described above, the present disclosure is not limited to the above-described embodiment and may be practiced in various forms.

(a) In the above-described embodiment, the beam receiving device 60 transmits the first positional signal to the laser marker 10 and the laser marker 10 transmits the second positional signal to the portable terminal device 51. However, the beam receiving device 60 may directly transmit the first positional signal to the portable terminal device 51. In this case, the transmitter 67 of the beam receiving device 60 may perform a wireless communication with the first device communicator 21a in accordance with the first communication protocol. And, the transmitter 67 of the beam receiving device 60 may perform a wireless communication with the terminal communicator 59 in accordance with the second communication protocol. Furthermore, the transmitter 67 may include a first transmitter and a second transmitter, respectively, that perform wireless communications in accordance with the first communication protocol and the second communication protocol.

Figure 8:
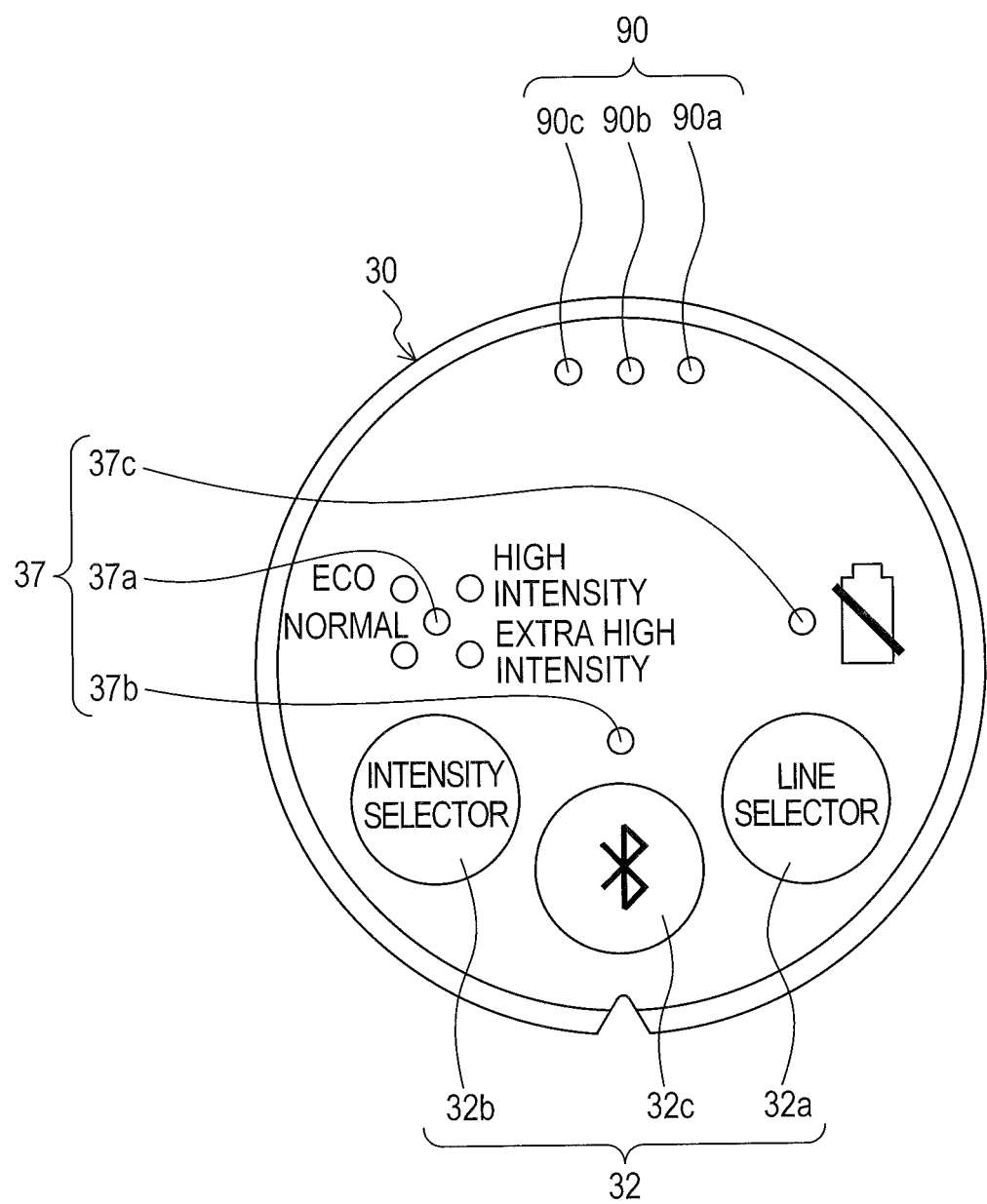
FIG. 8 is a diagram showing an appearance of a user interface of a laser marker according to another embodiment.

(b) The laser marking system 1 according to the above-described embodiment includes the laser marker 10, the beam receiving device 60, and the portable terminal device 51. However, the laser marking system 1 may include only the laser marker 10 and the beam receiving device 60. That is, the portable terminal device 51 may be removed from the laser marking system 1. In this case, the laser marker 10 may include the notifier. For example, the user interface 30 may be provided with a device beam receiving position indicator 90 as shown in FIG. 8. The device beam receiving position indicator 90 includes a first device LED 90a, a second device LED 90b, and a third device LED 90c. The first device LED 90a, the second device LED 90b, and the third device LED 90c are arranged in this order from the right side of the user interface 30. The first device LED 90a, the second device LED 90b, and the third device LED 90c, respectively, correspond to (or is associated with or is related to) the first LED 71a, the second LED 71b, and the third LED 71c of the beam receiving device 60. In the device beam receiving position indicator 90, corresponding one of the first device LED 90a, the second device LED 90b, or the third device LED 90c lights on in accordance with the first positional signal received from the beam receiving device 60.

(c) In the above-described embodiment, the portable terminal device 51 includes the terminal display 57, the vibrator 56, and the speaker 58 as the notifier. However, the portable terminal device 51 may include only two or one of the terminal display 57, the vibrator, 56, or the speaker 58.

(d) Two or more functions performed by a single element in the aforementioned embodiments may be achieved by two or more elements, or a function performed by a single element may be achieved by two or more elements. Furthermore, two or more functions performed by two or more elements may be achieved by a single element, or a function achieved by two or more elements may be achieved by a single element. Also, a part of a configuration in the aforementioned embodiment may be omitted. Moreover, at least a part of a configuration in the aforementioned embodiment may be added to or replaced with another configuration in the aforementioned embodiment.

What is claimed is:

1. A laser marking system comprising:
   a laser marker including:
      a laser beam emitter configured to emit a laser beam;
      a first device communicator configured to perform a first wireless communication with a beam receiving device;
      a second device communicator configured to perform a second wireless communication with a portable terminal device; and
      a device control circuit configured, in response to the first device communicator receiving or having received a first positional signal, to transmit a second positional signal to the portable terminal device via the second device communicator;
   the beam receiving device including:
      a laser beam receiver configured to receive the laser beam;
      a transmitter configured to perform the first wireless communication with the laser marker; and
      a beam receiving control circuit configured to:
         generate the first positional signal in accordance with a receiving position of the laser beam in the laser beam receiver; and
         transmit the first positional signal to the laser marker via the transmitter; and
   the portable terminal device including:
      a terminal display;
      a speaker;
      a vibrator;
      a terminal communicator configured to perform the second wireless communication with the laser marker; and
      a terminal control circuit configured to, in response to the terminal communicator receiving or having received the second positional signal:
         (i) cause the display to show the receiving position of the laser beam;
         (ii) cause the speaker to output a sound in accordance with the receiving position of the laser beam; and
         (iii) cause the vibrator to output a vibration in accordance with the receiving position of the laser beam.

2. A laser marking system comprising:
   a laser marker including a laser beam emitter configured to emit a laser beam;
   a beam receiving device including:
      a beam receiver configured to receive the laser beam emitted from the laser beam emitter; and
      a transmitter configured to transmit a first positional signal, the first positional signal indicating a receiving position of the laser beam in the beam receiver, the receiving position of the laser beam corresponding to a center position, a left position, or a right position, the center position corresponding to a center of the beam receiver, the left position corresponding to a leftward position to the center position, and the right position corresponding to a rightward position to the center position; and
   a notifier configured to notify of the receiving position of the laser beam based on the first positional signal transmitted by the transmitter.

3. The laser marking system according to claim 2, wherein the laser marker further includes a device communicator configured to (i) receive the first positional signal and (ii) transmit a second positional signal in response to receipt of the first positional signal, the second positional signal corresponding to the first positional signal.

4. The laser marking system according to claim 3, further comprising a portable terminal device, the portable terminal device including:
   a terminal communicator configured to receive the first positional signal or the second positional signal; and
   the notifier.

5. The laser marking system according to claim 4, wherein the device communicator is configured to:
   perform a first wireless communication with the transmitter; and
   perform a second wireless communication with the portable terminal device,
   wherein the transmitter is configured to transmit the first positional signal to the device communicator through the first wireless communication,
   wherein the terminal communicator is configured to receive the second positional signal from the device communicator through the second wireless communication, and
   wherein the notifier is configured to notify of the receiving position of the laser beam based on the second positional signal received by the terminal communicator.

6. The laser marking system according to claim 3,
   wherein the laser marker includes the notifier,
   wherein the transmitter is configured to transmit the first positional signal to the device communicator through a wireless communication, and
   wherein the notifier is configured to notify of the receiving position of the laser beam based on the first positional signal received by the device communicator.

7. The laser marking system according to claim 4, wherein the notifier includes:
- a display configured to show the receiving position of the laser beam based on the first positional signal or the second positional signal;
- a speaker configured to output a sound based on the first positional signal or the second positional signal, the sound corresponding to the receiving position of the laser beam; and/or
- a vibrator configured to output a vibration based on the first positional signal or the second positional signal, the vibration corresponding to the receiving position of the laser beam.

8. The laser marking system according to claim 7,
wherein the portable terminal device further includes a limiter configured to set an output limitation(s) on the speaker and/or the vibrator, and
wherein the speaker and/or the vibrator are/is configured to give a priority to the output limitation(s), to thereby stop outputting the sound and/or the vibrator in response to the limiter setting or having set the output limitation(s).

9. A portable terminal device comprising:
- a terminal communicator configured to receive a positional signal through a wireless communication, the positional signal indicating a receiving position of a laser beam in a beam receiver of a beam receiving device, the laser beam being emitted from a laser marker and received by the beam receiver, the receiving position of the laser beam corresponding to a center position, a left position, or a right position, the center position corresponding to a center of the beam receiver, the left position corresponding to a leftward position to the center position, and the right position corresponding to a rightward position to the center position; and
- a notifier configured to notify of the receiving position of the laser beam based on the positional signal received by the terminal communicator.

10. A method of notifying a receiving position of a laser beam via a portable terminal device, the method comprising:
- obtaining a positional signal, the positional signal indicating a receiving position of a laser beam in a beam receiver of a beam receiving device, the laser beam being emitted from a laser marker, the receiving position of the laser beam corresponding to a center position, a left position, or a right position, the center position corresponding to a center of the beam receiver, the left position corresponding to a leftward position to the center position, and the right position corresponding to a rightward position to the center position; and
- notifying of the receiving position of the laser beam based on the positional signal obtained.

11. The method according to claim 10,
wherein the portable terminal device includes a display, and
wherein notifying of the receiving position of the laser beam based on the positional signal obtained includes showing the receiving position of the laser beam on the display based on the positional signal.

12. The method according to claim 10,
wherein the portable terminal device includes a speaker, and
wherein notifying of the receiving position of the laser beam based on the positional signal obtained includes outputting a sound via the speaker based on the positional signal, the sound corresponding to the receiving position of the laser beam.

13. The method according to claim 10,
wherein the portable terminal device includes a vibrator, and
wherein notifying of the receiving position of the laser beam based on the positional signal obtained includes outputting a vibration via the vibrator based on the positional signal, the vibration corresponding to the receiving position of the laser beam.

* * * * *